H. TRILLICH.
EXTRACTING CAFFEIN FROM COFFEE.
APPLICATION FILED APR. 15, 1909.
953,073.
Patented Mar. 29, 1910.
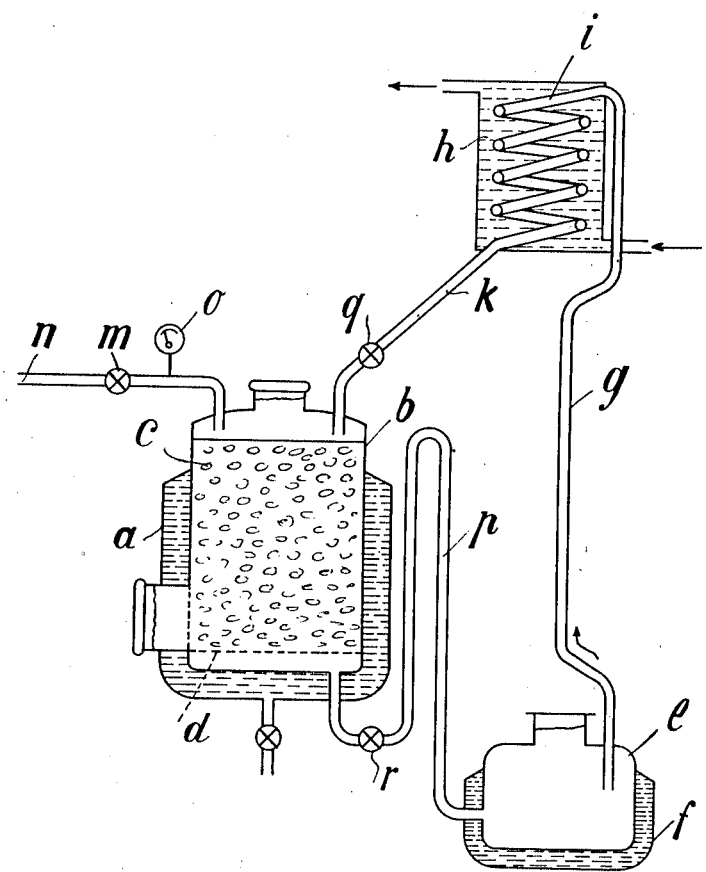
Witnesses
AM Wilson
Inventor
Heinrich Trillich
by Nicholas L. Bogan
Attorney

UNITED STATES PATENT OFFICE.

HEINRICH TRILLICH, OF MUNICH, GERMANY.

EXTRACTING CAFFEIN FROM COFFEE.

953,073.  Specification of Letters Patent.  Patented Mar. 29, 1910.

Application filed April 15, 1909. Serial No. 490,162.

*To all whom it may concern:*

Be it known that I, HEINRICH TRILLICH, a subject of the King of Bavaria, residing at 21 Prinzregentenplatz, Munich, Bavaria, Germany, have invented certain new and useful Improvements in Processes of Extracting Caffein from Coffee or from Similar Materials which Contain Caffein, of which the following is a specification.

My invention aims to provide a process of extracting caffein from raw unground coffee and from similar materials which contain caffein, which is very effective and furnishes, within a comparatively short time, a product which is sufficiently freed from caffein, but which does not lose any aromatic or other useful ingredients of the coffee.

As is known, it is not possible to extract caffein from raw coffee beans thoroughly, even when using the best dissolvents of caffein, which leave undissolved the aromatic and other useful ingredients of the coffee, and continuing the extracting for two or three days, for two reasons, first due partly to the existence in the beans of combinations between caffein and tannic matters, which belong, as is well known, to the natural constituents of coffee, and second to the poor penetration of the dissolvent into the beans.

My improved process aims at dissociating the combinations of caffein and tannin-containing substances by effecting a sufficient penetration of the dissolvent into the coffee beans. In order to attain this end, I propose to cover the coffee beans in their raw state, and similar materials which contain caffein, with dissolvents such as acetic ether, benzol, carbon tetrachlorid, ethane tetrachlorid, benzol dichlorid, chloroform, sulfuric ether, dichlorhydrin, epichlorhydrin, carbon sulfid, ethylene trichlorid, and which leave undissolved the aromatic and other useful ingredients of the coffee, and to produce a pressure of from one to two atmospheres—for instance by means of introducing steam into an autoclave boiler which contains the coffee beans covered by the dissolvent, whereby the latter is vaporized and owing to the non-escape of the vapors a high internal pressure is produced causing the dissolvent to thoroughly penetrate the beans to dissociate the caffein and tannic acid combinations to facilitate the caffein extraction.

Hot acetic ether is preferred as a dissolvent of the caffein, because it is considered the most effective dissolvent of caffein and does not leave a bad smell in the product, as it is to be found with benzol, chloroform and the like.

It occurs sometimes that certain characters of coffee cannot be thoroughly extracted by a single extraction, and therefore it has been found necessary to alternate the production of the pressure and the extracting.

After having performed the extraction, the residues of the dissolvent which adhere to the coffee, are evaporated in the usual manner.

Referring to the drawing, $b$ denotes an extraction vessel surrounded by heating jacket $a$ and is furthermore provided near its bottom with a sieve $d$. The vessel $b$ is adapted to receive the coffee beans $c$. Communicating with the bottom of the vessel $b$ is a siphon conduit $p$ which opens into the still $e$, the latter being surrounded by the heating jacket $f$. Projecting from the still $e$ is a pipe $g$ which opens at its upper end in a coil $i$ mounted in a cooler $h$. The coil $i$ is connected with the upper end of the vessel $b$ by a pipe $k$ provided with a cut-off $q$. Projecting from the upper end of the vessel $b$ is an outlet pipe $n$ having a cut-off $m$ and interposed between the cut-off $m$ and the vessel $b$ is a pressure gage $o$.

The extracting medium flows from the coil $i$ into the receptacle $b$ and onto the beans $c$ and is carried over by the siphon conduit $p$ into the still $e$, from which it extends up the pipe $g$ and returns to the coil $i$. The conduit pipe $p$ is provided with a cut-off $r$. If the cut-offs $m$, $q$, and $r$ are closed, there can be generated in the vessel $b$ by the heating thereof through the medium of a heating jacket $a$, a sufficiently high internal pressure for use in connection with the method. The pressure can be indicated by the gage $o$. By opening the cut-off $m$ the pressure within the vessel $b$ can be regulated.

A specific example carrying out the process is as follows: Into the vessel $b$ is placed 40 kg. of raw coffee beans, without the beans being subjected to any previous treatment, that is to say, the green beans are removed from the bags in which they are shipped in from the plantation, such quantity of beans fills the vessel $b$ to a point near the top thereof. After the beans have been placed in the vessel $b$ acetic ether is run into the vessel, the quantity of the acetic ether being such that after absorption by the beans the level of the ether will be as nearly as high as the upper bend of the siphon conduit $p$, the quantity of the acetic ether being approximately 70 liters. 50 liters of acetic acid is also placed in the still $e$, then the filling openings of the vessel $b$ and still $e$ are closed. All of the valves of the vessel $b$ are closed tight, that is the valves $q$, $m$ and $r$, whereupon steam is introduced into the jacket $a$. Supplying of steam to the jacket $a$ brings the acetic ether in the vessel $b$ to a boil or in other words vaporizes the ether, the generated vapors in consequence of the closed valves cannot escape, under such conditions there arises in the vessel $b$ in about thirty minutes an internal pressure, whose height can be read by the gage $o$. The pressure due to the generation in the vapors in the closed vessel $b$ is allowed to rise to a point of from one to two atmospheres and kept at the desired point for an hour due to the regulation of the steam supply. The generation of the vapors in the manner as stated and holding them at the pressure desired dissociates the combinations of caffein and tannin-containing substances and effects a sufficient penetration of solvent into the coffee beans, whereby the extraction of the caffein is facilitated when the beans are subjected to extraction by a suitable dissolvent. After the pressure has been maintained for about an hour at the point desired, the valve $q$ is opened, and the vapors escape through the pipe $k$ into the cooling pipe $i$ and they are condensed and flow back into the vessel $b$. Steam is then supplied to the steam jacket of the still $e$ so that the acetic ether therein will be heated and the vapors generated by such action will escape through the pipe $g$ and be condensed in the cooling pipe $i$ and flow through the pipe $k$ into the vessel $b$. In the meanwhile the valve $r$ is opened and as soon as the acetic ether in the siphon conduit $p$ has exceeded the highest point of the siphon, the siphon begins to pull and withdraws the acetic ether contained in the vessel $b$ and discharges it into the still $e$, naturally including the dissolved caffein, while the coffee beans are held back by the perforated bottom $d$ of the vessel $b$. The acetic ether that has been drawn into the still $e$ and caused to evaporate rises in the form of vapor through the pipe $g$ and condenses in the cooling pipe $i$ and flows back into the pipe $k$ into the vessel $b$ but the caffein dissolved by the acetic ether remains behind in the still $e$. This step is continued about three hours. Thereupon the coffee beans are again subjected for an hour with the hot acetic acid under a pressure of from one to two atmospheres and then again subjected to the siphoning action for three hours at ordinary temperature. The heating of the steam jacket $f$ is then discontinued and the valve $r$ closed after the last remains of the acetic ether has been run off. The valve $q$ is then closed and the condensed acetic ether is conducted to a supply vessel. The coffee beans are then removed from the vessel $b$ and dried by hot air in any known manner.

What I claim is:—

1. The process of extracting caffein from raw coffee beans and similar materials containing caffein, consisting in placing in a closed vessel raw coffee beans submerged in a dissolvent of caffein which leaves undissolved the aromatic and other valuable constituents of the beans, then subjecting the mass to heat whereby the dissolvent will vaporize and the vapors create in the vessel a pressure of from one to two atmospheres so as to cause the dissolvent to thoroughly penetrate the beans to dissociate the caffein and tannin-containing substances whereby the extraction of the caffein will be facilitated, and then extracting the caffein which has been dissociated during the subjecting of the beans to pressure.

2. The process of extracting caffein from raw coffee beans and similar materials containing caffein, consisting in placing in a closed vessel raw coffee beans submerged in a dissolvent of caffein which leaves undissolved the aromatic and other valuable constituents of the beans, then subjecting the mass to heat whereby the dissolvent will vaporize and the vapors create in the vessel a pressure of from one to two atmospheres so as to cause the dissolvent to thoroughly penetrate the beans to dissociate the caffein and tannin-containing substances whereby the extraction of the caffein will be facilitated, then extracting the caffein which has been dissociated during the subjecting of the beans to pressure, and then evaporating the dissolvent adhering to the coffee beans.

3. In a process of extracting caffein from raw coffee beans and similar materials containing caffein placing in a closed vessel raw coffee beans submerged in a dissolvent of caffein substantially such as described, and then subjecting the mass to heat whereby the dissolvent will be vaporized creating within the vessel a pressure of from one to two atmospheres causing thereby the thorough penetration of the solvent into the beans to dissociate the combinations of caffein and tannin-containing substances.

In testimony whereof I affix my signature.

HEINRICH TRILLICH.

In the presence of—
  LOUIS I. MUELLER,
  MATHILDE K. HELD.